US008948160B1

(12) United States Patent
Sylvain et al.

(10) Patent No.: US 8,948,160 B1
(45) Date of Patent: Feb. 3, 2015

(54) CONTROLLING SERVICES IN A CIRCUIT-SWITCHED NETWORK FROM A PACKET NETWORK

(75) Inventors: Dany Sylvain, Gatineau (CA); Cristian Constantinof, Kanata (CA)

(73) Assignee: Genband US LLC, Plano, TX (US)

( * ) Notice: Subject to any disclaimer, the term of this patent is extended or adjusted under 35 U.S.C. 154(b) by 1752 days.

(21) Appl. No.: 11/961,933

(22) Filed: Dec. 20, 2007

(51) Int. Cl.
*H04L 12/66* (2006.01)

(52) U.S. Cl.
USPC ........... 370/352; 370/351; 370/356; 370/355; 370/354; 370/353; 379/212.01

(58) Field of Classification Search
USPC .............................. 370/351–356; 379/212.01
See application file for complete search history.

(56) References Cited

U.S. PATENT DOCUMENTS

| 7,477,734 | B1* | 1/2009 | Smith ...................... 379/220.01 |
| 8,045,983 | B2 | 10/2011 | Bantukul |
| 8,346,944 | B2 | 1/2013 | Bantukul et al. |
| 2003/0076815 | A1 | 4/2003 | Miller et al. |
| 2004/0062383 | A1* | 4/2004 | Sylvain .................... 379/265.06 |
| 2005/0190721 | A1* | 9/2005 | Pershan ........................ 370/328 |
| 2005/0249196 | A1 | 11/2005 | Ansari et al. |
| 2006/0135166 | A1* | 6/2006 | Sylvain .......................... 455/445 |
| 2007/0064886 | A1* | 3/2007 | Chiu et al. ................... 379/88.17 |
| 2007/0165607 | A1* | 7/2007 | Mussman et al. ............. 370/352 |
| 2007/0263599 | A1* | 11/2007 | Itzkovitz et al. .............. 370/352 |
| 2007/0291733 | A1* | 12/2007 | Doran et al. .................... 370/352 |
| 2010/0265880 | A1* | 10/2010 | Rautiola et al. ............... 370/328 |
| 2010/0272096 | A1* | 10/2010 | Witzel et al. .................. 370/352 |

* cited by examiner

*Primary Examiner* — Khaled Kassim
(74) *Attorney, Agent, or Firm* — Jenkins, Wilson, Taylor & Hunt, P.A.

(57) ABSTRACT

The present invention relates to providing services for circuit-switched calls from an Internet Protocol (IP) based packet network. In essence, a call originating from or intended for a subscriber that is served by a telephony switch, such as an end office or mobile switching center, in a circuit-switched network is intercepted and routed by the telephony switch to a service node via a subscriber emulator. The subscriber emulator acts as a liaison between the telephony switch of the circuit-switched network and the service node of the packet network. Preferably, the subscriber emulator presents itself to the service node as a user agent, which acts on behalf of a subscriber that is served the telephony switch. The service node provides any requisite processing of the call to implement services for the call.

20 Claims, 7 Drawing Sheets

CONTROLLING SERVICES IN A CIRCUIT-SWITCHED NETWORK FROM A PACKET NETWORK

FIELD OF THE INVENTION

The present invention relates to communications, and in particular to providing services for a circuit-switched call by a service node residing in a packet network.

BACKGROUND OF THE INVENTION

Given the evolution of packet-based communications, multimedia sessions may be afforded numerous types of sophisticated services when these multimedia sessions are provided in an appropriate packet network. These services allow communicating endpoints and intermediate control nodes to negotiate, control, and provide management for virtually any type or combination of sessions. These sessions may include voice, streaming audio and video, conferencing, messaging, and push-to-talk sessions. By supporting different types of sessions and associated services, a rich communication experience is afforded to subscribers who communicate over packet networks.

However, voice communications, normally in the form of a telephony call, remain the dominant type of communications. A vast majority of telephony calls are supported by circuit-switched subsystems, which rely on wireline or wireless telephony switches that use Time Division Multiplexed (TDM) bearer paths, which are controlled by Intelligent Networks that provide basic call processing. Unfortunately, these legacy circuit-switched networks have limited ability to provide the enhanced services for circuit-switched calls that packet networks can provide for multimedia sessions. Although there are services that can be provided by a packet network that do not lend themselves to telephony calls, there are a significant number of such services that would benefit circuit-switched telephony calls, if it were feasible or economically practical to do so. Unfortunately, the nature of legacy telephony switches, whether wireline or wireless, does not lend itself to implementing these enhanced services for circuit-switched telephony calls. As such, there has been a movement to provide services for circuit-switched telephony calls from a packet network; however, there remains a need for an efficient and effective technique for providing enhanced services for calls that are originated from and directed to subscribers served by circuit-switched networks. There is a further need to provide these services for circuit-switched telephony calls from a packet network in a manner that reduces the need for adding, changing, or modifying equipment or the telephony switches that reside in the circuit-switched networks.

SUMMARY OF THE INVENTION

The present invention relates to providing services for circuit-switched calls from an Internet Protocol (IP) based packet network. In essence, a call originating from or intended for a subscriber that is served by a telephony switch, such as an end office or mobile switching center in a circuit-switched network, is intercepted and routed by the telephony switch to a service node via a subscriber emulator. The subscriber emulator acts as a liaison between the telephony switch of the circuit-switched network and the service node of the packet network. Preferably, the subscriber emulator presents itself to the service node as a user agent, which acts on behalf of a subscriber that is served by the telephony switch. The service node provides any requisite processing of the call to implement services for the call. Based on the processing provided by the service node, incoming calls may be routed to the subscriber through the subscriber emulator and telephony switch or may be redirected to another destination. Similarly, outgoing calls may be further routed toward the originally intended destination or redirected to another destination.

In one embodiment, incoming calls intended for a subscriber are received at the telephony switch that supports the subscriber. Upon receipt of the call, the telephony switch sends an Intelligent Network (IN) trigger to the subscriber emulator, which will analyze the IN trigger and instruct the telephony switch to route the call to the subscriber emulator. The subscriber emulator will then route the call via the packet network to the service node, which will provide the requisite processing of the call to implement services for the call. If the service node determines that the call should be presented to the subscriber via the telephony switch, the call is routed back to telephony switch via the subscriber emulator. The telephony switch will then present the call to the subscriber. Alternatively, the processing may cause the service node to route the call toward another destination, as is the case when the call is directed to voicemail or for call forwarding.

In another embodiment, outgoing calls that are originated from the subscriber and intended for a remote party are initially presented to the telephony switch that supports the subscriber. Upon being presented the call, the telephony switch will send an IN trigger to the subscriber emulator, which will analyze the IN trigger and instruct the telephony switch to route the call to the subscriber emulator via a signaling network for the circuit-switched network. The subscriber emulator will then route the call in an appropriate fashion toward the remote party network or to any other entity dictated by the service node.

With the present invention, subscribers that are supported by a given telephony switch may be afforded services provided by a service node, which residing in a packet network. As such, certain subscribers may receive services provided by the service node while others do not. Further, the service node can provide different services for different subscribers who are served by the same telephony switch. The subscriber emulator not only allows a range of new services to be delivered to the subscribers that are served by legacy telephony switches, but also allows those services to be delivered consistently and simultaneously across different access methods, including wired and wireless packet, legacy wireline, and legacy wireless access methods. Some of the services include, but are not limited, to: advanced call routing, such as call screening, time of day routing, simultaneous ringing; network-based call logging; phone activity status monitoring for presence systems; call transfer from one access method to another; private dialing plan support, such as that used in enterprise networks; and the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to providing services for circuit-switched calls from an Internet Protocol (IP) based packet network. In essence, a call originating from or intended for a subscriber that is served by a telephony switch in a circuit-switched network is intercepted and routed by the telephony switch to a service node via a subscriber emulator. The subscriber emulator acts as a liaison between the telephony switch of the circuit-switched network and the service node of the packet network. The subscriber emulator may present itself to the service node as a user agent, which acts on behalf of a subscriber that is served by the telephony switch. The service node provides any requisite processing of the call to implement services for the call. Based on the processing provided by the service node, incoming calls may be routed to the subscriber through the subscriber emulator and telephony switch or redirected to another destination. Similarly, outgoing calls may be further routed toward the originally intended destination or may be redirected to another destination. The present invention allows a range of new services that are provided from the packet network to be delivered to the subscribers that are served by legacy telephony switches in an efficient and effective manner. Prior to delving into the details of the present invention, an overview of a communication environment in which the present invention may be employed is described.

Figure 1:
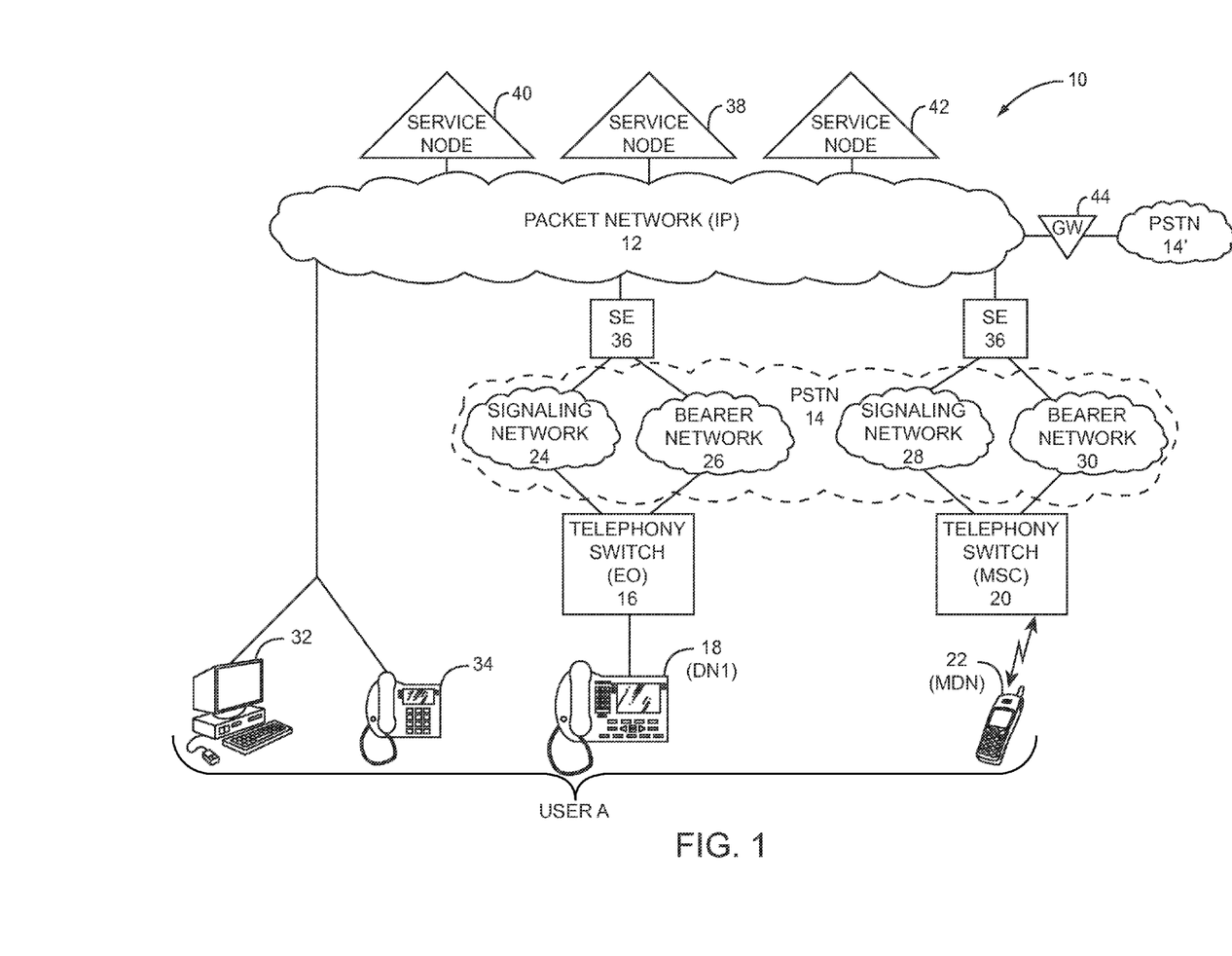
FIG. 1 is a block representation of a communication environment according to one embodiment of the present invention.

With reference to FIG. 1, a communication network 10 is illustrated according to one embodiment of the present invention. In general, a packet network 12, which supports Internet Protocol (IP) or like communications, and a Public Switched Telephone Network (PSTN) 14 are provided to support various types of communications. As illustrated, a first telephony switch 16, such as a traditional end office (EO) switch, supports a Plain Old Telephone System (POTS) subscriber terminal 18 over a dedicated telephony line. As depicted, the telephony line is associated with a directory number, DN1. The first telephony switch 16 represents those legacy switches that support wireline communications. For legacy wireless communications, such as those provided in cellular communication networks, a second telephony switch 20, such as a mobile switching center, supports wireless communications with a mobile subscriber terminal 22, which may be associated with a permanent or temporary mobile directory number, MDN.

The PSTN 14 includes signaling portions that control bearer paths through bearer portions. For simplicity, those signaling portions of the PSTN 14 are referred to as "signaling networks," and those bearer portions of the PSTN 14 are referred to as "bearer networks." In particular, the first telephony switch 16 and the second telephony switch 20 are respectively associated with signaling networks 24 and 28, as well as bearer networks 26 and 30. Although these signaling networks 24, 28 and bearer networks 26, 30 are shown as separate networks within the PSTN 14, those skilled in the art will recognize that these networks may be one and the same, depending on the configuration and relative location of the networks. For example, the signaling networks 24, 28 may be Intelligent Networks (INs) that support Signaling System 7 (SS7) signaling, while the bearer networks 26, 30 may include any number of trunks and intermediate switches to facilitate circuit-switched connections between the first and second telephony switches 16, 20 and other points in the PSTN 14. The packet network 12 may directly support various communication terminals, such as a personal computer 32 and a Voice over IP (VoIP) terminal 34, which are capable of connecting directly to the packet network 12 through an appropriate access network, and support packet-based communications.

As noted above, the present invention allows services that are provided by the packet network 12 to be provided for calls originating from or intended for subscribers that are served by the PSTN 14 through EO 16 or MSC 20. In one embodiment, a subscriber emulator (SE) 36 is logically positioned between the packet network 12 and the PSTN 14. In particular, the signaling networks 24, 28 and bearer networks 26, 30 for the respective first and second telephony switches 16, 20 are coupled to corresponding SEs 36. The SEs 36 are further coupled to the packet network 12. The SEs 36 act as user agents for subscribers that are supported by the first telephony switch 16 and the second telephony switch 20, respectively. The user agent is presented to the packet network 12, and in particular to an appropriate service node 38 that is configured to provide services for communication sessions, including the calls that originate from or are intended for subscribers supported by the first telephony switch 16 or the second telephony switch 20. As such, the SEs 36 appear to the service node 38 and other entities of the packet network 12 as a subscriber terminal or proxy therefor.

In operation, incoming calls intended for a subscriber being served by the first telephony switch 16 or the second telephony switch 20 are intercepted at the corresponding switch and routed to the corresponding SE 36. The SE 36 will then route the call to the service node 38, which will provide any necessary call processing to implement the desired services. The incoming call should still be routed to the subscriber that is served by the first or second telephony switch 16, 20. After processing, the service node 38 will route the call back through the SE 36 to the appropriate first or second telephony switch 16, 20. For outgoing calls, the first or second telephony switch 16, 20 may route the calls to the corresponding SE 36, even if the calls are intended for a subscriber served by the PSTN 14. The SE 36 will route the call to the service node 38 for processing, wherein the service node 38 may route the call toward the originally intended destination or another destination, depending on the call processing.

In one embodiment, the first and second telephony switches 16, 20 are provisioned to recognize incoming calls intended for a certain subscriber or outgoing calls initiated from a certain subscriber. Upon recognizing an incoming or outgoing call for a certain subscriber, an appropriate IN trigger is generated and sent to the corresponding SE 36. For incoming calls, an IN Termination Attempt Trigger (TAT) may be provided from a telephony switch 16, 20 to the SE 36. For outgoing calls, an IN Information Analyzed Trigger (IAT) may be sent from the telephony switch 16, 20 to the SE 36. Notably, the first and second telephony switches 16, 20 only need to have IN triggers provisioned in the above fashion for those subscribers that should receive services from the service node 38. For those subscribers that are not to receive services from the service node 38, these IN triggers are not provisioned in the corresponding first and second telephony switches 16, 20. As such, each of the first and second telephony switches 16, 20 may allow certain subscribers to gain access to the services provided by the service node 38 while preventing other subscribers from gaining access to the services provided by the service node 38. In many instances, the services provided by the first and second telephony switches 16, 20 are bypassed and replaced by those services provided by the service node 38; however, such action is not required. Accordingly, services may be provided for a call supported by the first or second telephony switch 16, 20 by the corresponding first or second telephony switch 16, 20 and by the service node 38.

Notably, the services provided by the packet network 12 may be provided by different service nodes 40, 42 alone or in cooperation with the service node 38. For example, a single service node 38 may act as a Session Initiation Protocol (SIP) call server, wherein a group of service nodes 38, 40, 42 may cooperate to provide a call/session control function (CSCF) and associated application servers of an IP Multimedia Subsystem, such as that set forth by the Third Generation Partnership Project (3GPP). The entity providing the services from within the packet network 12 is not as important for the present invention as the fact that an entity of the packet network 12 is able to provide services for calls that involve a subscriber being served by the PSTN 14. Further, the service node 38 may redirect calls to other portions of the PSTN 14' through one or more gateways (GW) 44, as will be described in further detail below.

With the present invention, subscribers that are supported by a given telephony switch 16, 20 may be afforded services provided by the service node 38, which resides in the packet network 12. As such, certain subscribers may receive services provided by the service node 38 while others do not. Further, the service node 38 can provide different services for different subscribers who served by the same telephony switch 16, 20. The SE 36 not only allows a range of new services to be delivered to the subscribers that are served by the legacy telephony switches 16, 20, but also allows those services to be delivered consistently and simultaneously across different access methods, including wired and wireless packet, legacy wireline, and legacy wireless access methods. Some of the services include, but are not limited, to: advanced call routing, such as call screening, time of day routing, simultaneous ringing; network-based call logging; phone activity status monitoring for presence systems; call transfer from one access method to another; private dialing plan support, such as that used in enterprise networks; and the like.

Figure 2:
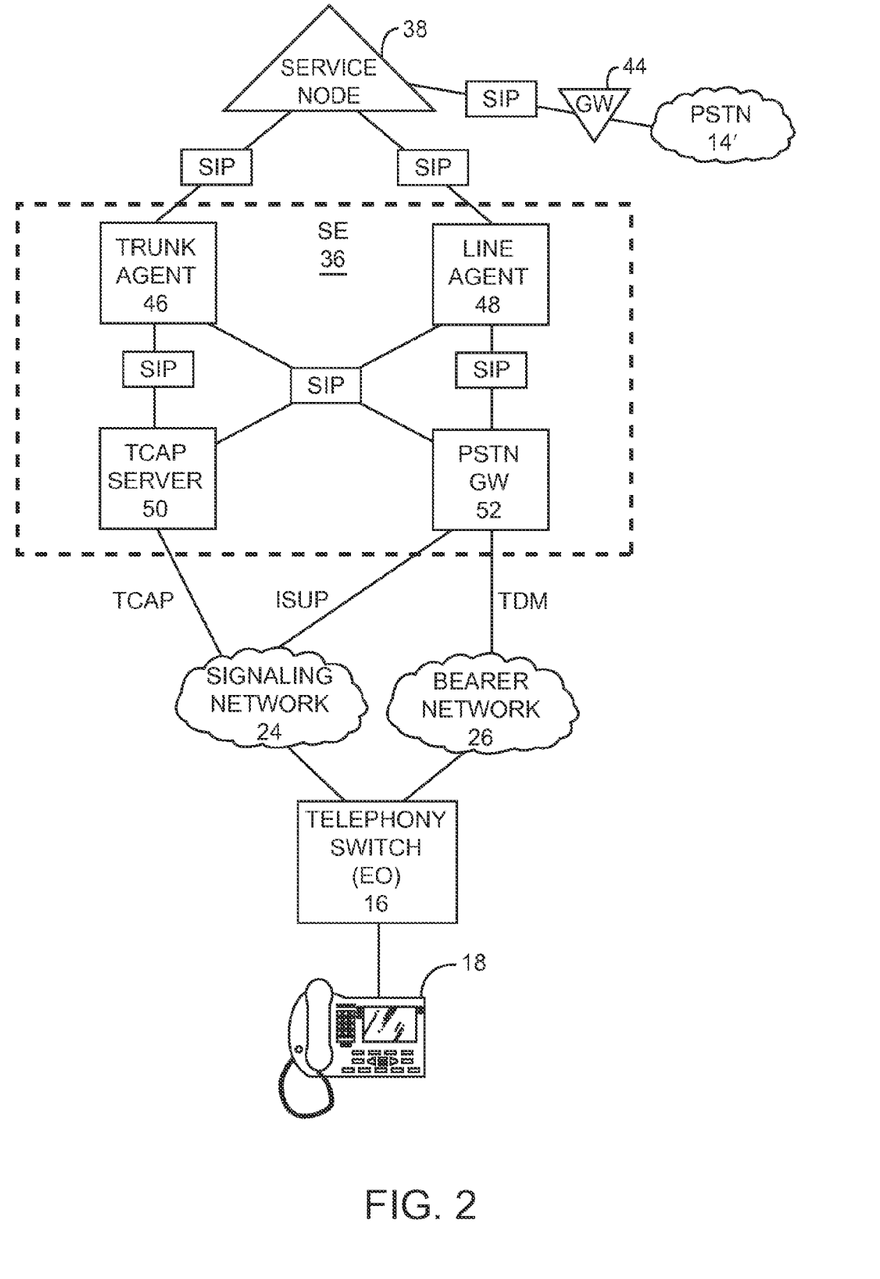
FIG. 2 provides a block representation of a subscriber emulator and an associated portion of a communication environment according to one embodiment of the present invention.

With reference to FIG. 2, a portion of the communication environment 10 is illustrated, wherein the SE 36 is broken into multiple elements, which include a trunk agent 46, a line agent 48, a Transaction Capabilities Application Part (TCAP) server 50, and a PSTN gateway 52, according to one embodiment of the present invention. Notably, FIG. 2 is focused on the SE 36 that is associated with the first telephony switch 16. Although the following discussion references the first telephony switch 16, those skilled in the art will recognize that the aspects of the SE 36 and the overall interaction with the first telephony switch 16 are the same or analogous to the aspects of the SE 36 and interactions that would take place with the second telephony switch 20. Further, the trunk agent 46, line agent 48, TCAP server 50, and PSTN gateway 52 may be implemented in the same or different nodes. In alternative embodiments, the functionality provided by these entities may be implemented in various ways and by functions other than those depicted. As such, the present invention is not limited to the illustrated configuration of the SE 36. Further, the packet network 12 is not illustrated in FIG. 2 for clarity. Those skilled in the art will recognize that the service node 38 resides in the packet network 12 and interacts with the SE 36 via the packet network 12.

An overview of the basic functionality of the trunk agent 46, line agent, 48, TCAP server 50, and PSTN gateway 52 is provided prior to providing detailed examples of their operation in association with multiple communication flows. For bearer traffic, the PSTN gateway 52 will convert Time Division Multiplex (TDM) bearer traffic from the bearer network 26 to packet traffic, such as VoIP traffic, for delivery over the packet network 12, as well as convert packet traffic from the packet network 12 to circuit-switched traffic for delivery over the bearer network 26. Accordingly, the PSTN gateway 52 can convert bearer traffic between circuit-switched and packet-based formats in either direction in support of a call or like session. The PSTN gateway 52 provides a similar function for the signaling that is associated with a call. Accordingly, the PSTN gateway 52 converts call signaling between circuit-switched and packet-based formats. In one embodiment, the signaling network 24 relies on the Integrated Services User Part (ISUP) protocol for signaling messages, and as such, ISUP call signaling messages are exchanged between the telephony switch 16 and the PSTN gateway 52 through the signaling network 24. If SIP is relied upon for session control in the packet network 12, the PSTN gateway 52 will convert ISUP call signaling to SIP session signaling, and vice versa, for a given call to facilitate call signaling between the circuit-switched network or PSTN 14 and the packet network 12. Depending on the scenario, the SIP signaling may be exchanged between the PSTN gateway 52 and the trunk agent 46 or line agent 48, as will be illustrated further below. Accordingly, the PSTN gateway 52 provides basic bearer and signaling interworking between the signaling network 24 and the bearer network 26 of the PSTN 14 and the packet network 12 via the trunk agent 46 or the line agent 48.

As illustrated, the TCAP server 50 is configured to receive and process the IN triggers that are generated by the telephony switch 16, when a select subscriber initiates a call or when an incoming call for the subscriber reaches the telephony switch 16. The IN triggers may be carried in TCAP messages from the telephony switch 16 to the TCAP server 50 through the signaling network 24. In general, the TCAP server 50 will process the IN triggers and provide corresponding instructions to one or both of the trunk agent 46 or the line agent 48, depending on the scenario. These instructions are generally routing instructions, which aid in rerouting calls from the telephony switch 16 into the packet network 12 and to the service node 38. Accordingly, the TCAP server 50 helps to determine whether a call should be routed to the service node 38 to receive services provided thereby, and cooperates with the telephony switch 16 as well as the trunk agent 46 and line agent 48 to facilitate rerouting the call to the service node 38.

The line agent 48 provides the user agent that acts on behalf of the subscriber, and that is presented to the packet network 12 in general, and to the service node 38 in particular. As such, the line agent 48 may process any signaling exchanged between the PSTN gateway 52 and the service node 38 such that the line agent 48 appears as a subscriber endpoint residing on the packet network 12, or at least a proxy thereof. For outgoing calls, the line agent 48 may interact with the TCAP server 50 to obtain instructions to assist in routing the outgoing call toward the service node 38. For incoming calls, the line agent 48 facilitates the routing of a call that was routed through the call server 38 back to the telephony switch 16 from the service node 38.

The trunk agent 46 is predominantly involved in the handling of incoming calls intended for the subscriber. In essence, an incoming call intended for a subscriber will reach the telephony switch 16. To receive services from the service node 38, the call must be routed through the service node 38 prior to being presented to the subscriber. As such, the telephony switch 16 must be instructed to route the call through the service node 38 prior to the call being delivered to the subscriber.

As noted above, an IN trigger may be sent to the TCAP server 50 when the incoming call reaches the telephony switch 16. The TCAP server 50 will instruct the telephony switch 16 to route the call to the trunk agent 46 instead of presenting the call to the subscriber. Accordingly, the telephony switch 16 will route the call to the trunk agent 46, which under the instruction of the TCAP server 50 will route the call to the service node 38. When the trunk agent 46 presents the call to the service node 38, it will act as a remote user agent that is initiating a call to the subscriber being served by the telephony switch 16. Thus, when the service node 38 is finished processing the call, the call may be routed to the telephony switch 16 through the line agent 48 and the PSTN gateway 52, and then presented to the subscriber. Accordingly, the trunk agent 46 facilitates the routing of incoming calls intended for a subscriber through the service node 38 prior to being presented to the subscriber.

Figure 3:
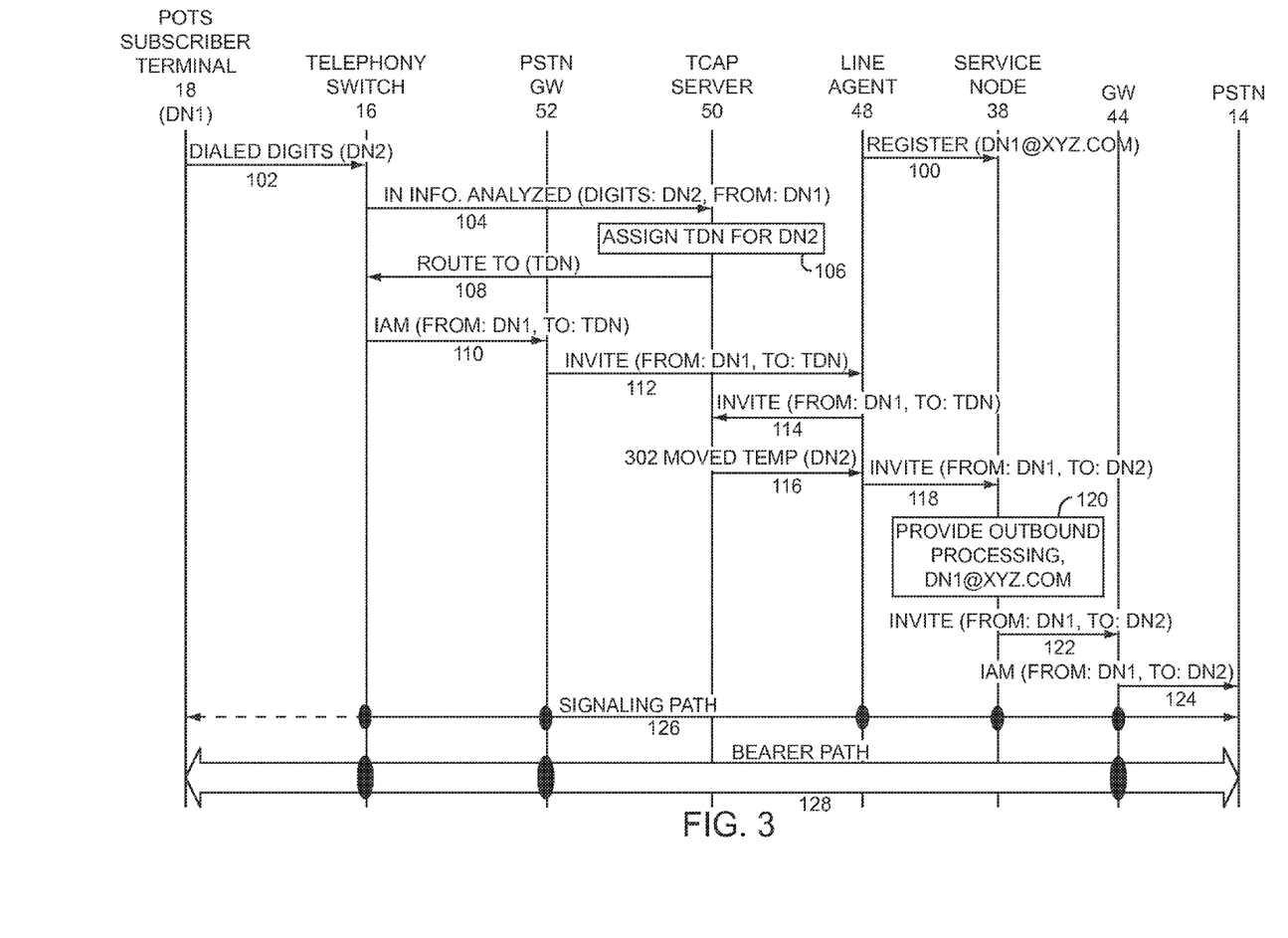
FIG. 3 is a communication flow illustrating initiation of an outgoing call according to one embodiment of the present invention.

The following communication flows are used to illustrate the interworking of the trunk agent 46, line agent 48, TCAP server 50, and PSTN gateway 52 of the SE 36 for both outgoing and incoming calls. With reference to FIG. 3, a communication flow is provided for routing an outgoing call that is initiated by a subscriber supported by the telephony switch 16 to the service node 38 for call processing. Initially, the line agent 48 may register with the service node 38 (step 100). This registration effectively registers the line agent 48 with the service node 38 as a user agent, such as a SIP user agent, which represents the subscriber. In this example, the uniform resource identifier (URI) associated with the subscriber in the packet network 12 is DN1@XYZ.COM. Once registered, the service node 38 will recognize that the subscriber is ready to make and receive calls. Further, the registration information or the profile for the subscriber that is maintained in the service node 38 may indicate that a limited set of services is available to the subscriber.

Next, the POTS subscriber terminal 18 will initiate a call to a remote terminal (not shown) by delivering dialed digits, which correspond to a directory number DN2, to the telephony switch 16 to initiate the outgoing call (step 102). The telephony switch 16 is provisioned to provide an IN Information (Info) Analyzed trigger to the TCAP server 50 upon receiving outgoing calls from the POTS subscriber terminal 18, and as such will send an IN Info Analyzed message to the TCAP server 50 (step 104). The TCAP server 50 may be configured to recognize that outgoing calls from the subscriber should be routed to the service node 38 for processing, and take the necessary steps to instruct the telephony switch 16 to route the call accordingly. In this example, the TCAP server 50 will assign a temporary directory number (TDN), which will be used by the telephony switch 16 to route the call to the line agent 48 (step 106). The TCAP server 50 will send a message to the telephony switch 16 to route the outgoing call to the line agent 48 using the TDN (step 108). Notably, the IN Info Analyzed trigger that was sent to the TCAP server 50 and the message instructing the telephony switch 16 to route the call toward the line agent 48 may be TCAP messages that are delivered over the signaling network 24.

In response to receiving the routing instructions from the TCAP server 50, the telephony switch 16 may send an ISUP Initial Address Message (IAM) to route the call toward the line agent 48 (step 110). In this example, the temporary directory number is associated with the PSTN gateway 52, which will receive the IAM sent by the telephony switch 16 and convert the IAM into a corresponding session initiation message, such as a SIP Invite message, which is delivered to the line agent 48 (step 112). At this point, the call has been routed from the telephony switch 16 to the line agent 48 through the PSTN gateway 52. The line agent 48 may be provisioned to initially route calls for the subscriber received from the telephony switch 16 to the TCAP server 50, and as such, the Invite message may be forwarded to the TCAP server 50 (step 114). The TCAP server 50 will recognize that this is a call that is being rerouted from the telephony switch 16 to the service node 38. As such, the TCAP server 50 will instruct the line agent 48 to route the call to DN2 by replacing the temporary directory number in the Invite message with the directory number, DN2, corresponding to the originally intended destination.

The line agent 48 will forward the Invite message to the service node 38 (step 118), which will provide any requisite outbound processing (step 120) and then forward the call toward its destination. In this example, an Invite message is sent toward the gateway 44 (step 122), which will generate an IAM toward the originally intended destination through the PSTN 14', which may be a remote portion of the PSTN 14. The outbound processing provided by the service node 38 is sufficient to implement any of the requisite services that should be applied to outgoing calls from the subscriber when those calls are originated through the telephony switch 16. In this example, the call processing did not result in rerouting the call to another destination. However, such rerouting may take place, depending on the service being provided by the service node 38. In this example, any type of service, such as call logging or the gathering of presence information bearing on the subscriber's use of the POTS subscriber terminal 18, may be provided.

The signaling path may extend between the POTS subscriber terminal 18, or at least the telephony switch 16, and the PSTN 14' through the PSTN gateway 52, line agent 48, service node 38, and gateway 44 (step 126). As such, the service node 38 may provide processing for signaling messages in either direction. If a bearer path is established, it may extend between the POTS subscriber terminal 18 and the PSTN 14' through the telephony switch 16, PSTN gateway 52, and gateway 44 (step 128).

Figure 4A:
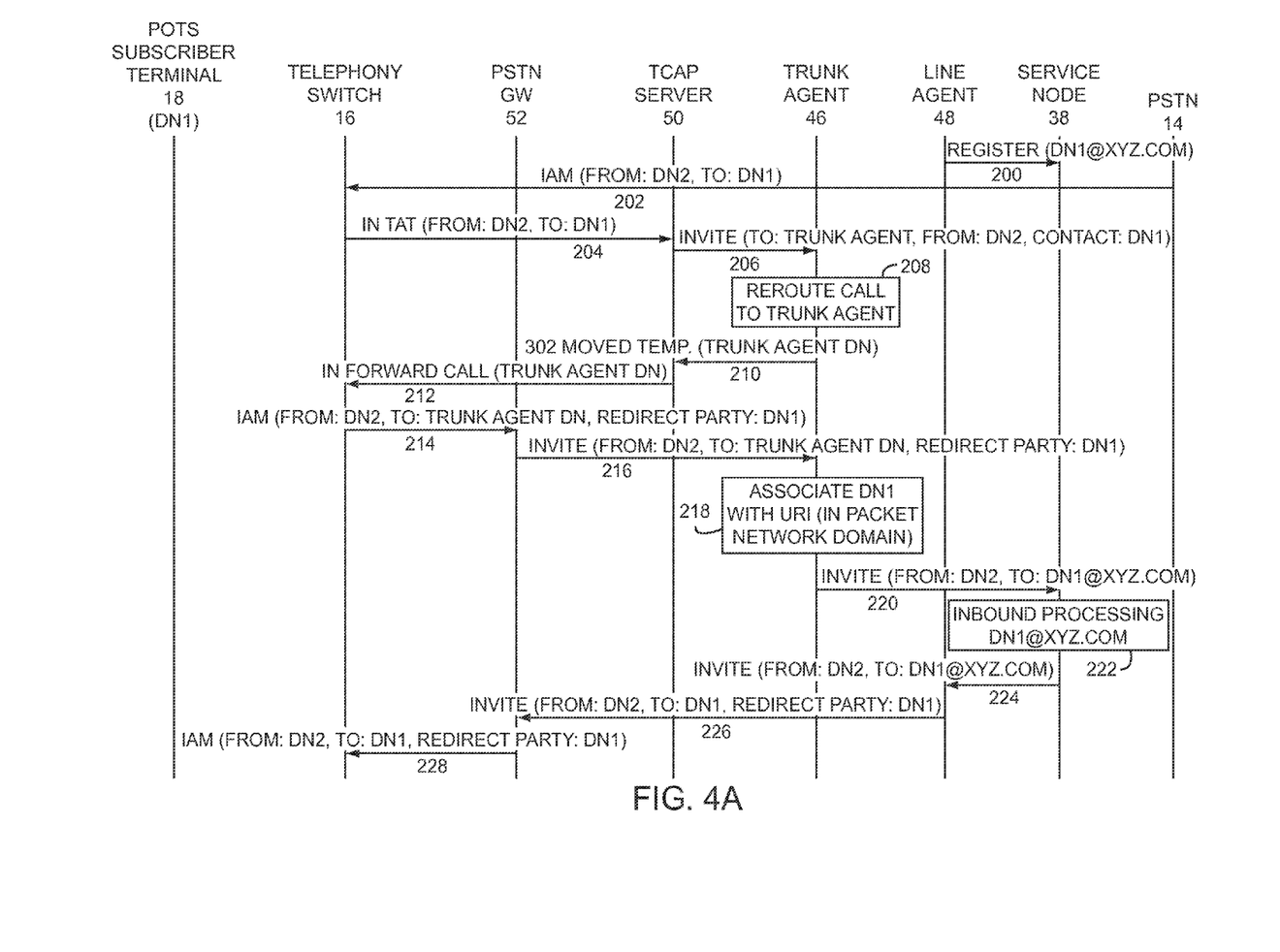
FIGS. 4A and 4B are a communication flow illustrating termination of an incoming call according to one embodiment of the present invention.
Figure 4B:
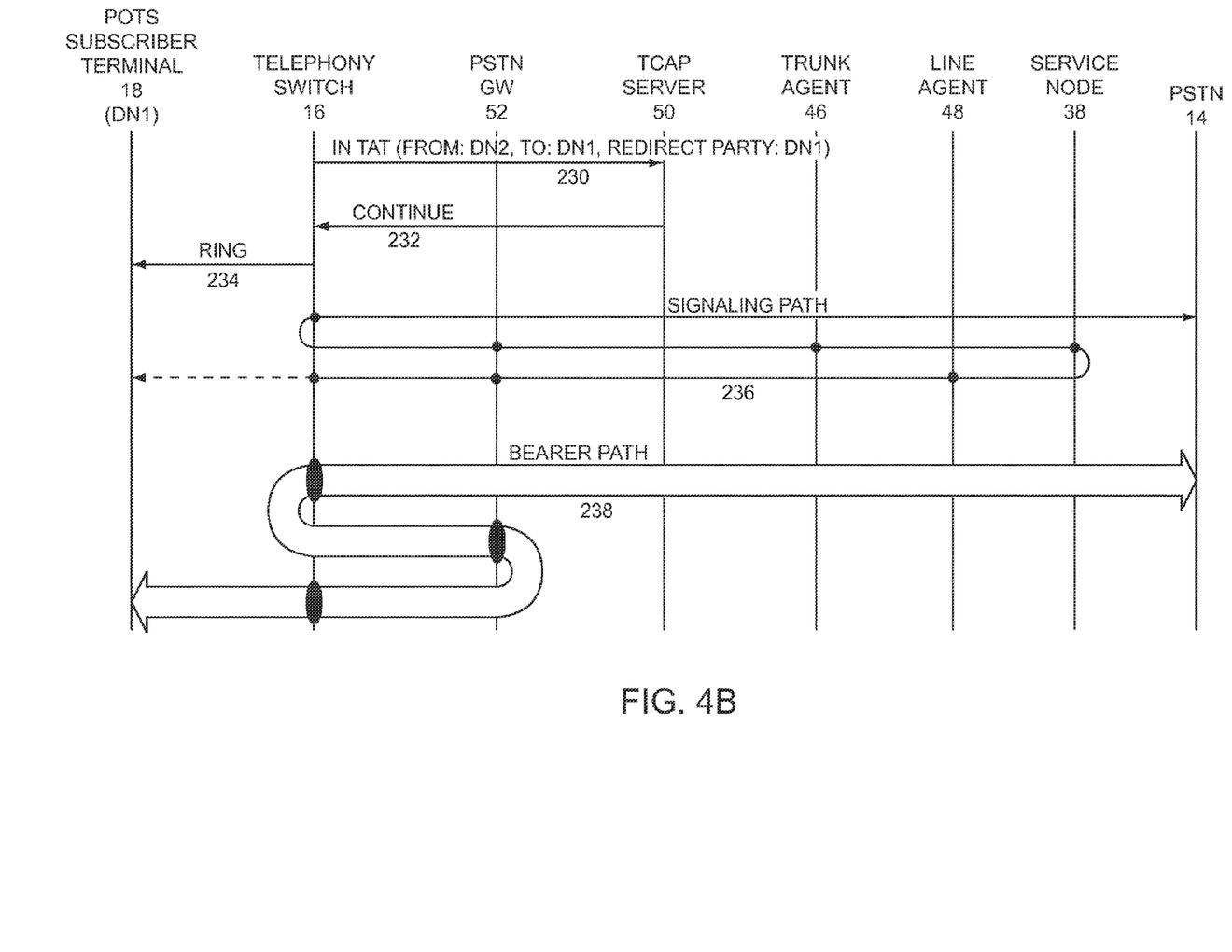

With reference to FIGS. 4A and 4B, a communication flow for processing an incoming call is provided according to one embodiment of the present invention. As with the above communication flow, the line agent 48 may initially register with the service node 38 (step 200). Again, the registration indicates that the subscriber is ready to initiate or receive calls at the telephony switch 16. In this example, assume that an incoming call intended for the subscriber is received at the telephony switch 16. As illustrated, an IAM is received at the telephony switch 16 (step 202), and indicates that a call was initiated from directory number DN2 and is intended for directory number DN1, which is associated with the subscriber, or at least with the POTS subscriber terminal 18. The telephony switch 16 is provisioned to provide an IN Termination Attempt Trigger (TAT) to the TCAP server 50 upon receiving an incoming call intended for the subscriber (step 204). The TCAP server 50 will inform the trunk agent 46 of the incoming call, perhaps by initiating an Invite message that is sent to the trunk agent 46 (step 206). The Invite message is intended for the trunk agent 46 and indicates that the incoming call was initiated from directory number DN2 and originally intended for directory number DN1, which is associated with the subscriber.

The trunk agent 46 will take the necessary steps to reroute the call from the telephony switch 16 to the trunk agent 46 (step 208). To accomplish this, the trunk agent 46 may send a SIP 302 Moved Temporarily message back to the TCAP server 50 (step 210). This message may provide the directory number associated with the trunk agent, TRUNK AGENT DN, which can be used by the telephony switch 16 to route the call toward the trunk agent 46. Upon receipt of the 302 Moved Temp message, the TCAP server 50 will respond to the IN TAT by sending an IN Forward Call message to the telephony switch 16 (step 212). The IN Forward Call message will instruct the telephony switch 16 to forward the incoming call using the trunk agent directory number.

As such, the telephony switch 16 will send an IAM toward the trunk agent directory number, which is supported by the PSTN gateway 52 (step 214). The IAM will indicate that the call was originally initiated from directory number DN2 and that it is being redirected from directory number DN1 to the trunk agent directory number. The PSTN gateway 52 will convert the IAM received over the signaling network 24 of the circuit-switched network to a packet-based Invite message, which is delivered to the trunk agent 46 (step 216). As such, the TCAP server 50 has effectively caused the telephony switch 16 to route the incoming call to the trunk agent 46. The trunk agent 46 will associated the directory number associated with the subscriber, DN1, with a corresponding URI for the subscriber that is maintained in the packet network, or SIP domain (step 218). In this example, the destination for the call is changed from the directory number DN1 to the URI DN1@XYZ.COM, which is the URI for the subscriber in the packet network domain.

At this point, the trunk agent 46 will route the call through the service node 38 and back to the telephony switch 16 through the line agent 48. Initially, the trunk agent 46 will send an Invite message to the service node 38 to route the call to the service node 38 for processing (step 220). The service node 38 will provide any requisite inbound processing for the subscriber (step 222), and then route the call to the line agent 48, which acts as a user agent on behalf of the subscriber. Accordingly, the service node 38 will send an Invite message to the line agent 48 (step 224), which will forward the Invite message toward the PSTN gateway 52 (step 226). Notably, the Invite message sent to the PSTN gateway 52 may indicate that the call was redirected through the service node 38, and as such, has been processed by the service node 38. The PSTN gateway 52 will convert the Invite message to an appropriate circuit-switched IAM, and deliver the IAM to the telephony switch 16 (step 228). The IAM may also indicate that the call has been redirected.

At this point, the telephony switch 16 recognizes that there is an incoming call intended for the subscriber, and as such, will send an IN TAT to the TCAP server 50 (step 230). Preferably, the IN TAT will also indicate that the call was redirected through the service node 38. The TCAP server 50 will recognize that this is the return of the original call that was redirected through the service node 38, and as such, will instruct the telephony switch 16 to continue with normal call processing by sending a Continue message to the telephony switch 16 (step 232). The telephony switch 16 will present the call to the POTS subscriber terminal 18 in normal fashion. This may entail sending a Ringing signal over a corresponding telephony line to the POTS subscriber terminal 18 (step 234). Signaling may be exchanged between the POTS subscriber terminal 18, or at least the telephony switch 16, and the PSTN 14 through the PSTN gateway 52, line agent 48, service node 38, trunk agent 46, back through the PSTN gateway 52, telephony switch 16, and toward the PSTN 14 (step 236). The associated bearer path will extend between the POTS subscriber terminal 18 and the PSTN 14 via the telephony switch 16 and PSTN gateway 52 as illustrated (step 238). Those skilled in the art will recognize that call signaling may be further optimized; however, it is preferably to maintain the service node 38 in the signaling path to ensure proper implementation of the necessary call processing for any services being provided for the call.

Figure 5:
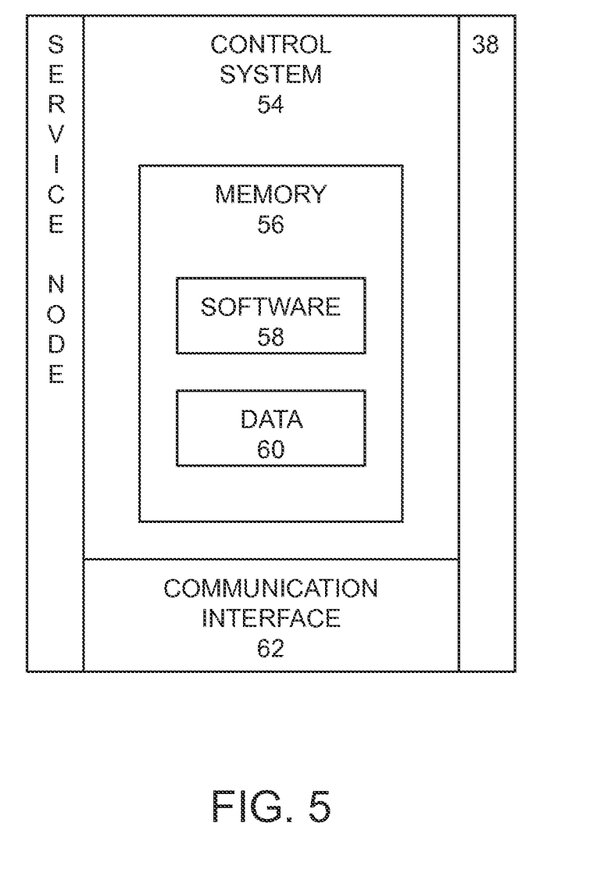
FIG. 5 is a block representation of a service node according to one embodiment of the present invention.

With reference to FIG. 5, a block representation of a service node 38 is provided according to one embodiment of the present invention. The service node 38 may include a control system 54 having sufficient memory 56 for the requisite software 58 and data 60 to operate as described above. The control system 54 may be associated with a communication interface 62 to facilitate communications over the packet network 12.

Figure 6:
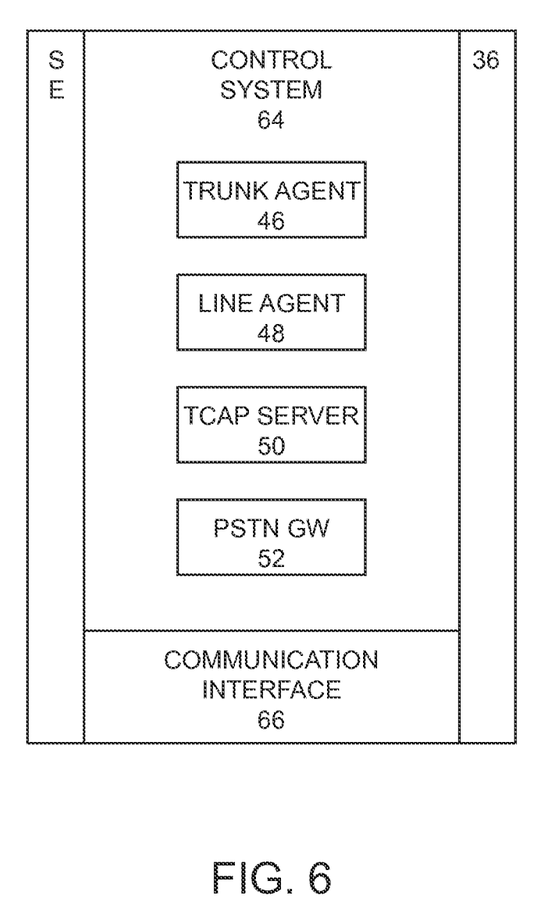
FIG. 6 is a block representation of a subscriber element according to one embodiment of the present invention.

With reference to FIG. 6, a block representation of a subscriber element 36 is provided according to one embodiment of the present invention. The SE 36 may include a control system 64, which is capable of providing the trunk agent 46, line agent 48, TCAP server 50, PSTN gateway 52, or any combination thereof. The control system 64 may also be associated with any number of communication interfaces 66 to facilitate the communications described above. In other embodiments, the various functions provided by the SE 36 may be provided by different types of service nodes, which are located in the same or different locations.

Those skilled in the art will recognize improvements and modifications to the preferred embodiments of the present invention. All such improvements and modifications are considered within the scope of the concepts disclosed herein and the claims that follow.

What is claimed is:

1. A method of operating a subscriber emulation system comprising:
   detecting that a call either originates from or is intended for a subscriber being served by a telephony switch residing in a circuit-switched network, wherein the telephony switch includes an end office (EO) or a mobile switching center (MSC), and wherein detecting that the call originates from or is intended for a subscriber being served by the telephony switch includes receiving an Intelligent Network trigger that indicates one of a group consisting of:
   an incoming call intended for the subscriber was received by the telephony switch; and an outgoing call originated from the subscriber was detected by the telephony switch;

instructing the telephony switch residing in the circuit-switched network to intercept and reroute the call signaling and bearer paths toward the subscriber emulation system, wherein the subscriber emulation system includes a packet-switched interface and a circuit-switched interface, wherein instructing the telephony switch to reroute the call comprises instructing the telephony switch to route the call through the circuit-switched network to a gateway that routes the call to at least one of a trunk agent or a line agent, which is configured to act on behalf of an entity that initiated the call, wherein the gateway, the trunk agent, and the line agent are associated with the subscriber emulation system;

receiving the call from the telephony switch via the circuit-switched interface of the subscriber emulation system; and routing the call to a service node in an Internet Protocol-based packet network via the packet network, wherein the subscriber emulation system is presented as a user agent that registers the subscriber into the packet network and acts on behalf of the subscriber to the service node and the service node processes the call to provide services for the call.

2. The method of claim 1 wherein when the call is an outgoing call originated from the subscriber, and instructing the telephony switch to reroute the call comprises instructing the telephony switch to route the call through the circuit-switched network to the gateway that routes the call to the line agent, which provides the user agent that acts on behalf of the subscriber, wherein the gateway and the line agent are associated with the subscriber emulation system.

3. The method of claim 2 wherein the gateway is adapted to interwork circuit-switched network signaling and packet network signaling for the call between the telephony switch and the line agent.

4. The method of claim 2 wherein the line agent accesses an Intelligent Network server that is associated with the subscriber emulation system to determine how to route the call to the service node.

5. The method of claim 4 wherein the call associated with the subscriber is detected by the Intelligent Network server, and the Intelligent Network server instructs the telephony switch to reroute the call toward the subscriber emulation system.

6. The method of claim 1 wherein when the call is an incoming call intended for the subscriber, further comprising receiving the call back from the service node via the packet network and routing the call to the telephony switch for presentation to the subscriber.

7. The method of claim 6 wherein instructing the telephony switch to reroute the call comprises instructing the telephony switch to route the call through the circuit-switched network to a gateway that routes the call to the trunk agent, which provides a remote user agent that acts on behalf of an entity that initiated the call and routes the call to the service node, wherein the gateway and the trunk agent are associated with the subscriber emulation system.

8. The method of claim 7 wherein the trunk agent accesses an Intelligent Network server that is associated with the subscriber emulation system to determine how to route the call to the service node.

9. The method of claim 8 wherein the call associated with the subscriber is detected by the Intelligent Network server and the Intelligent Network server instructs the telephony switch to reroute the call toward the subscriber emulation system.

10. The method of claim 6 wherein the call is received back from the service node at the line agent, which provides the user agent that acts on behalf of the subscriber and further routes the call toward the telephony switch.

11. The method of claim 10 wherein the call is routed from the line agent to the telephony switch through the gateway, wherein the line agent and the gateway are associated with the subscriber emulation system.

12. The method of claim 6 wherein the gateway is adapted to interwork circuit-switched network signaling and packet network signaling for the call between the telephony switch and both the line agent and trunk agent.

13. The method of claim 1 wherein the telephony switch serves a plurality of subscribers, and calls associated with a first group of the plurality of subscribers are redirected through the subscriber emulation system and presented to the service node for delivery of services, and calls associated with a second group of the plurality of subscribers are not redirected through the subscriber emulation system.

14. The method of claim 1 wherein the telephony switch is a wireline switch that supports the subscriber though a telephony line.

15. The method of claim 1 wherein the telephony switch is a mobile switching center for a cellular network and supports the subscriber through a cellular access network.

16. A subscriber emulation system comprising:
an Intelligent Network server adapted to detect that a call either originates from or is intended for a subscriber being served by a telephony switch residing in a circuit-switched network and instruct the telephony switch to intercept and reroute the call signaling and bearer paths toward the subscriber emulation system, wherein the telephony switch includes an end office (EO) or a mobile switching center (MSC), and wherein detecting that the call originates from or is intended for a subscriber being served by the telephony switch includes receiving an Intelligent Network trigger that indicates one of a group consisting of:
an incoming call intended for the subscriber was received by the telephony switch; and
an outgoing call originated from the subscriber was detected by the telephony switch;
a gateway adapted to receive the call from the telephony switch via the circuit-switched network, the gateway being configured to route the call to at least one of a trunk agent or a line agent, which is configured to act on behalf of an entity that initiated the call, and wherein the gateway, the trunk agent, and the line agent are associated with the subscriber emulation system; and
wherein the at least one trunk agent or line agent is adapted to route the call to a service node in an internet protocol-based packet network via the packet network wherein the subscriber emulation system is presented as a user agent that registers the subscriber into the packet network and acts on behalf of the subscriber to the service node and the service node processes the call to provide services for the call.

17. The subscriber emulation system of claim 16 wherein the call is an outgoing call originated from the subscriber, and to instruct the telephony switch to reroute the call, the Intelligent Network server is further adapted to instruct the telephony switch to route the call through the circuit-switched network to the gateway, which routes the call to the line agent, which provides the user agent that acts on behalf of the subscriber.

18. The subscriber emulation system of claim 16 wherein the call is an incoming call intended for the subscriber and the line agent is adapted to:
   act as the user agent on behalf of the subscriber;
   receive the call back from the service node via the packet network; and
   route the call through the gateway to the telephony switch for presentation to the subscriber.

19. The subscriber emulation system of claim 18 wherein instructing the telephony switch to reroute the call comprises instructing the telephony switch to route the call through the circuit-switched network to the gateway that routes the call to the trunk agent, which provides a remote user agent that acts on behalf of an entity that initiated the call, wherein the gateway and the trunk agent are associated with the subscriber emulation system.

20. The subscriber emulation system of claim 19 wherein the trunk agent is adapted to access the Intelligent Network server to determine how to route the call to the service node and route the call to the service node.

* * * * *